J. H. LEPSCH.
TIRE VULCANIZER APPARATUS.
APPLICATION FILED MAY 18, 1912.
1,153,324. Patented Sept. 14, 1915.
2 SHEETS—SHEET 1.
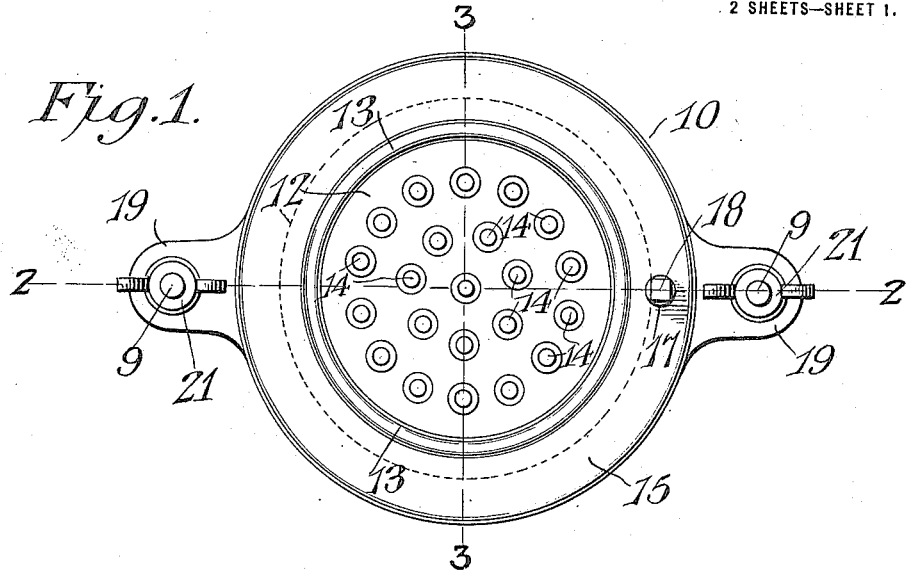
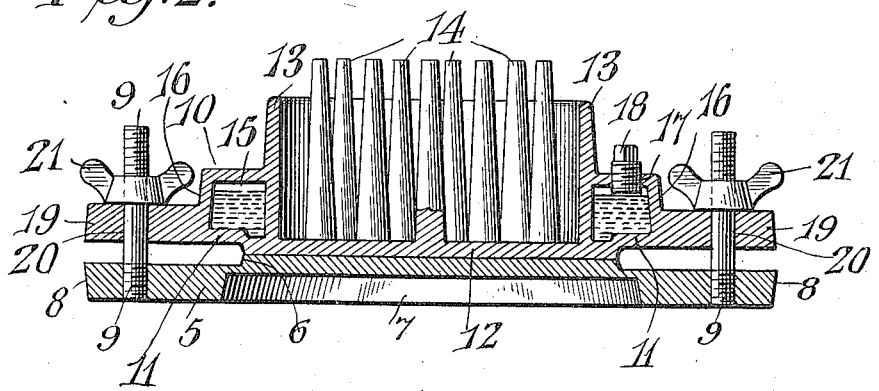
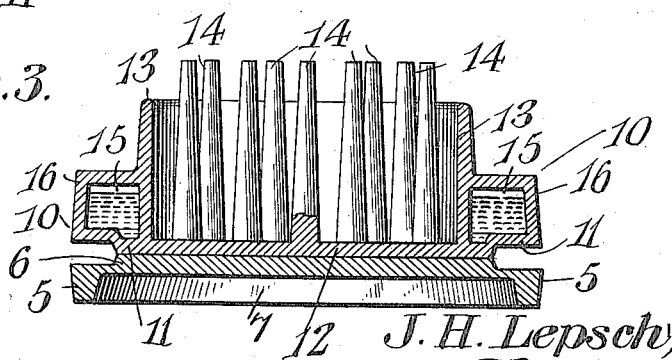
WITNESSES
Jas. F. McCathran
J. Stewart Rice
J. H. Lepsch, INVENTOR
BY
E. G. Siggers
ATTORNEY J. H. LEPSCH.
TIRE VULCANIZER APPARATUS.
APPLICATION FILED MAY 18, 1912.
1,153,324.
Patented Sept. 14, 1915.
2 SHEETS—SHEET 2.
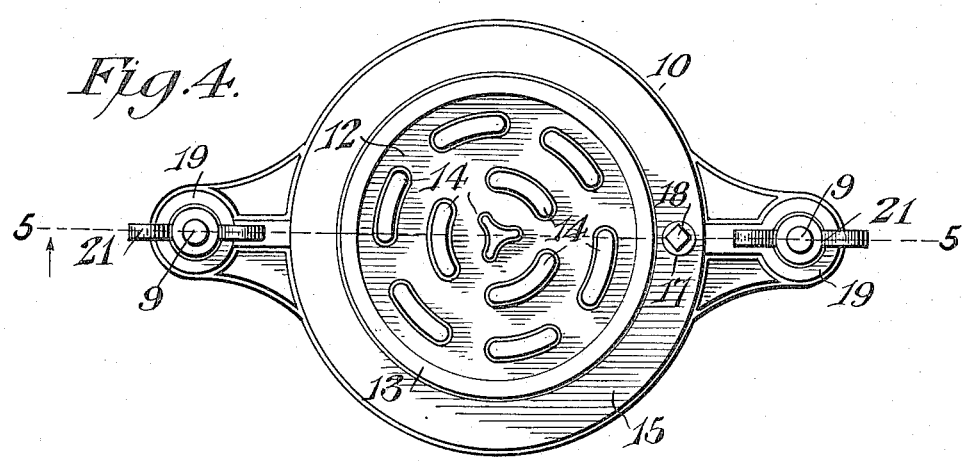
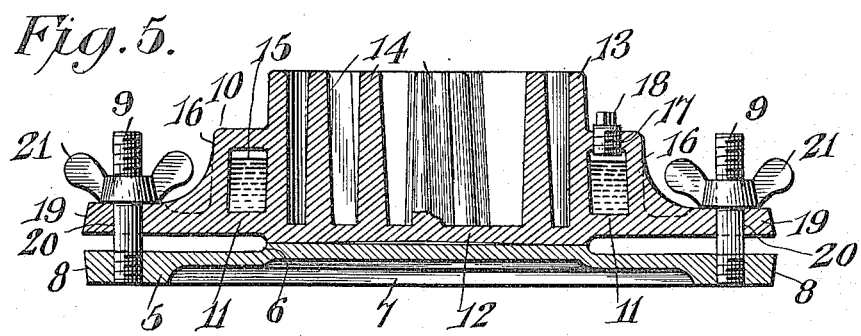
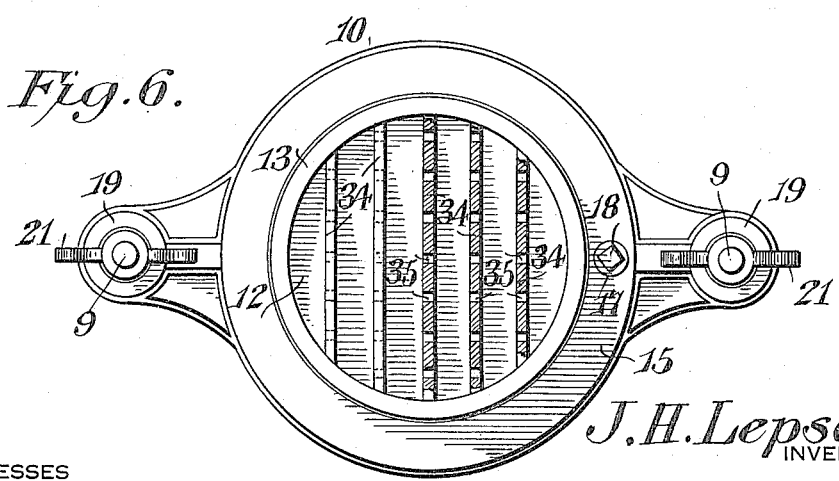
J. H. Lepsch
INVENTOR
WITNESSES
Jas. K. McCathran
J. Stewart Rice.
BY
E. G. Siggers
ATTORNEY

UNITED STATES PATENT OFFICE.

JOSEPH H. LEPSCH, OF RIDGWAY, PENNSYLVANIA.

TIRE-VULCANIZER APPARATUS.

1,153,324.   Specification of Letters Patent.   Patented Sept. 14, 1915.

Application filed May 18, 1912. Serial No. 698,254.

*To all whom it may concern:*

Be it known that I, JOSEPH H. LEPSCH, a citizen of the United States, residing at Ridgway, in the county of Elk and State of Pennsylvania, have invented a new and useful Tire-Vulcanizer Apparatus, of which the following is a specification.

My invention relates to improvements in vulcanizing apparatus, particularly designed for use in repairing the inner tubes of pneumatic tires, and has for its object to produce a self-contained and portable apparatus, which can be readily packed in a small space in the tool box of an automobile, and which is so simple that it may be employed by an inexperienced person to repair a punctured tube in a short space of time, and yet is so constructed that there is no danger of burning and injuring the tube during the operation.

It consists in certain features of construction and certain combinations and arrangements of parts hereinafter fully set forth and particularly pointed out in the claims.

In the accompanying drawing:—Figure 1 is a top plan view of my improved vulcanizing apparatus. Fig. 2 is a vertical transverse sectional view taken on the line 2—2 of of Fig. 1. Fig. 3 is a similar sectional view taken on the line 3—3 of Fig. 1. Fig. 4 is a top plan view of a modified form of my vulcanizing apparatus. Fig. 5 is a vertical transverse sectional view on the line 5—5 of Fig. 4. Fig. 6 is a top plan view, partly in section, of another modified form of my vulcanizing apparatus.

Referring to Figs. 1, 2 and 3 of the drawing, which represents the preferred embodiment of my invention, 5 designates the base member of the vulcanizer, said base member being circular in form and having its upper face formed with a concentrically disposed circular raised clamping face 6 serving as a support for the inner tube or other article to be vulcanized. The diameter of the clamping and supporting face of the base member is less than the diameter of the latter, as shown in Fig. 3. The underside of the base member is hollowed out to form a circular cavity or recess 7, which is of slightly greater diameter than the raised face 6. The base member is furnished with diametrically opposite outwardly projecting lugs 8, each of which is provided with an upwardly extending stud bolt 9.

Adapted to be removably secured on the base member 5 is a heating member 10, which comprises a circular body 11 having a circular portion depressed outwardly or downwardly below the plane of the bottom of the body to form a depending or outstanding flat clamping face 12, which corresponds in size with and is complemental to the clamping face 6 of the base member. The diameter of the clamping face 12 is less than the diameter of the heating member, while the general shape of the heating member corresponds with the base member.

Above the clamping face 12 of the heating member, and having a less diameter than said clamping face, the body of the heating member is formed with a circular receptacle 13, which is open at the top and serves as a combustion chamber. Projecting upwardly from the bottom of the combustion chamber are a plurality of spaced apart tapered integral projections or pins 14, which while shown extending above the top of the combustion chamber may terminate at or about the top thereof, as desired.

Surrounding the lower portion of the combustion chamber 13 is an annular water jacket 15. The inner vertical wall of the water jacket is formed by the circular side wall of the combustion chamber, while a portion of its bottom is formed by the clamping face 12 and the remaining portion of the outer margin of the bottom of the body 11. The remaining walls of the water jacket 15 are formed by an annular right angular wall 16, which extends horizontally outwardly from a point about midway of the outer side wall of the combustion chamber, and then down to the base member. In its top the water jacket is provided at one side with a filling hole 17 which is closed by a screw plug 18.

The body 11 of the heating member 10 is provided with diametrically opposite outwardly extending lugs 19, which are provided with apertures 20 adapted to receive the upper portions of the stud bolts 9 on the lugs 8 of the base member 5. Thumb nuts 21 are removably mounted on the upper screw threaded ends of the stud bolts and adjustably clamp the heater on the base member. When the two clamping faces 6 and 12 are forced together, a space is formed beyond their outer edges between the top of the base member 5 and the bottom of the heating member below the water jacket, by reason of the fact that the bottom of the heating member and the top of the base member are set in from their respective clamping faces, for the purpose hereinafter stated.

In Figs. 4 and 5 I illustrate a modification of the construction shown in Figs. 1, 2, and 3, and for purposes of comparison I have used the same reference numerals in Figs. 4 and 5 that are applied in detail to the parts shown in Figs. 1, 2 and 3. The heat-transmitting projections 14 in the form shown in Figs. 4 and 5 are shaped differently from the projections or studs 14 of Figs. 1, 2 and 3, and moreover they terminate flush with the upper edge of the combustion chamber, but their functions are unchanged. The annular water jacket 15 in the form shown in Figs. 4 and 5 is also slightly different in construction from the corresponding part shown in Figs. 1, 2 and 3. It is higher and not so wide, and its upper wall serves in a more efficient way to provide a shield or guard for the flame to prevent it from injuring the tube of the tire while the latter is being repaired.

Fig. 6 is another modification of my vulcanizer, which is similar to the form shown in Figs. 4 and 5 except with respect to the heat-conducting members. In this form, instead of employing vertical projections or studs, the interior of the combustion chamber 13 is provided with spaced-apart, equidistant, transverse partitions or bars 34, which preferably extend up flush with the top of the combustion chamber. The partitions or bars are tapered upwardly from their bases to their tops, and at or near the bottom of the combustion chamber they are provided with holes 35, which permit the gasolene poured into the combustion chamber to reach the same level in each compartment formed by said partitions or bars.

The drawings and description set forth several forms of heat-conducting lugs or members all of which embody the same characteristic, in that they taper from their bases to their upper ends or tops. Where the heat-conducting lugs or members are smaller, a greater number are employed, the object being to provide for different service conditions.

To vulcanize a patch on an inner tube, the surface at the point to be repaired is first thoroughly cleaned with sand paper, then with gasolene, or other suitable cleansing agent, and is then covered with a vulcanizing cement which is allowed to dry for a moment. Then a piece of crude rubber is placed over the puncture, and then the portion of the tube being repaired is placed between the clamping faces 6 and 12, which are brought as close together as desired by the clamping action of the thumb nuts 21. The combustion chamber 13 is filled with a sufficient quantity of gasolene to burn long enough to complete the vulcanizing operation, and then ignited, the burning gasolene heating the pins 14 or bars 34 and the sides of the combustion chamber, which will transmit or conduct sufficient heat to the upper clamping face 12 to effect the desired vulcanization. After the gasolene has been consumed, the members of the apparatus are separated and the tube is removed and allowed to cool, when the tube will be found to have a perfectly vulcanized patch.

The space between the two members of the apparatus outside the clamping faces will accommodate the outer edges of the tube and prevent them from being pressed down too closely. The water jacket 15 will prevent the exposed edges of the tube from being subjected to enough heat to injure the tube, and it also obviates overheating along the edges of the tube where no vulcanization is in process, and so prevents burning and injuring the rubber.

The top of the water jacket presents a shoulder which will intercept the flame, if blown over the side of the combustion chamber, and prevent it from burning the exposed edge of the tube.

From the foregoing it will be apparent that I have produced a vulcanizing apparatus which can be effectively used by an unskilled person, since its construction and operation are such that no regulation or experience is required to satisfactorily accomplish the vulcanization and at the same time avoid overheating the tube.

Changes in the form, proportion and minor details of construction may be made without departing from the spirit or sacrificing the scope of this invention.

What is claimed is:—

1. A vulcanizing apparatus comprising a base member forming an article support, a heating member adapted to be mounted above and in contact with said base member, a combustion chamber carried by said heating member, said combustion chamber being positioned immediately above said base member, the contacting portion of the heating member constituting the bottom of said chamber, a plurality of integral heat-transmitting members spaced apart and arranged within said combustion chamber, and a water jacket surrounding said combustion chamber and forming a part of the heating member.

2. A vulcanizing apparatus comprising a base member having a raised clamping face extending centrally above said base member and constituting an article support, a heating member adapted to be mounted above said base member and having a centrally arranged depending portion forming a clamping face to correspond to the clamping face of said base member, said clamping faces spacing the remaining portions of the two members from each other, means for adjusting the contact of said clamping faces, said heating member being provided with a combustion chamber the bottom of which is formed by its clamping face, and a water jacket surrounding said combustion chamber, the surrounding wall of said combustion chamber constituting the inner wall of said water jacket.

3. A vulcanizing apparatus comprising a base member having a centrally arranged clamping face extending above said base member and constituting an article support, a heating member adapted to be mounted above said base member and having a centrally arranged depressed portion at the bottom forming a depending clamping face corresponding to the clamping face of said base member, a combustion chamber formed in the heating member and located within the area of the depressed bottom of said heating member, said depressed portion constituting the bottom of the combustion chamber and the walls of the latter extending upwardly and open at the top, a water jacket surrounding said combustion chamber, the wall of said combustion chamber constituting the inner wall of said water jacket, and the outer wall of said water jacket being formed at the outer edge of the bottom of said heating member, whereby said water jacket overhangs the space outside the clamping faces of the two members.

4. In a vulcanizing apparatus, a base member having a centrally arranged clamping face extending above said base member and constituting an article support, a heating member adapted to be mounted above said base member and having a centrally arranged depending clamping face formed at the bottom of said heating member, said depending clamping face being coextensive with the clamping face of said base member, the diameter of the two clamping faces being less than the diameter of the two members, a combustion chamber formed in the heating member above its clamping face, the latter constituting the bottom wall of said chamber, the side walls of said chamber rising above the heating member and being open at the top, vertical studs projecting upwardly from the bottom of the combustion chamber, a water jacket surrounding said chamber, the bottom wall of said water jacket being formed by the marginal portion of the bottom of the heating member and the outer edge of the clamping face of said member, and clamping bolts connecting the two members and holding their clamping faces in close contact.

5. A vulcanizing apparatus comprising a base member forming an article support, a heating member adapted to be mounted above and in contact with said base member, a combustion chamber carried by said heating member, said combustion chamber being positioned immediately above said base member, a plurality of integral heat-transmitting members spaced apart and arranged within said combustion chamber, and a water jacket surrounding said combustion chamber and forming a part of the heating member, said water jacket being arranged outside the combustion chamber and below the upper edge thereof and having its upper wall constituting a shield or guard to prevent the flame from the combustion chamber from burning the tire.

6. A vulcanizing apparatus comprising a base member forming an article support, a heating member adapted to be mounted above and in contact with said base member, a combustion chamber carried by said heating member, said combustion chamber being positioned immediately above said base member, a plurality of integral heat transmitting members spaced apart and arranged within said combustion chamber, and a water jacket surrounding said combustion chamber and forming a part of the heating member, said water jacket having a portion arranged directly above the outer periphery of the contacting faces of the base member and heating member and serving to prevent burning the rubber.

In testimony that I claim the foregoing as my own, I have hereto affixed my signature in the presence of two witnesses.

JOSEPH H. LEPSCH.

Witnesses:
W. E. BURHANS,
M. O'CONNOR.